United States Patent
Roy et al.

(10) Patent No.: US 11,105,675 B2
(45) Date of Patent: Aug. 31, 2021

(54) UNOBTRUSIVE AND AUTOMATED DETECTION OF FREQUENCY OF VIBRATING OBJECTS USING MULTIPLE STROBE SOURCES

(71) Applicant: Tata Consultancy Services Limited, Mumbai (IN)

(72) Inventors: Dibyendu Roy, Kolkata (IN); Tapas Chakravarty, Kolkata (IN); Arpan Pal, Kolkata (IN); Archan Misra, Singapore (SG)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/750,122

(22) Filed: Jan. 23, 2020

(65) Prior Publication Data
US 2020/0240833 A1 Jul. 30, 2020

(30) Foreign Application Priority Data

Jan. 27, 2019 (IN) .............................. 201921001769

(51) Int. Cl.
*G01H 9/00* (2006.01)
*H04N 5/235* (2006.01)

(52) U.S. Cl.
CPC .............. *G01H 9/00* (2013.01); *H04N 5/2354* (2013.01)

(58) Field of Classification Search
CPC ......... G01H 9/00; H04N 5/2354; H04N 5/235
(Continued)

(56) References Cited

U.S. PATENT DOCUMENTS

2005/0030756 A1* 2/2005 Thomas ................. B60Q 1/326
362/500
2008/0243441 A1* 10/2008 Chen ....................... G01H 9/00
702/190
(Continued)

FOREIGN PATENT DOCUMENTS

| EP | 3 561 464 | 10/2019 |
|---|---|---|
| IN | 201721027017 | 2/2019 |
| IN | 201821015512 | 10/2019 |

OTHER PUBLICATIONS

Roy et al., Demo Abstract: Shake meter—An Autonomous Vibration Measurement System using Optical Strobing, Nov. 14-16, 2016, pp. 1-2. (Year: 2016).*
(Continued)

*Primary Examiner* — Christopher S Kelly
*Assistant Examiner* — Kathleen M Walsh
(74) *Attorney, Agent, or Firm* — Finnegan, Henderson, Farabow, Garrett & Dunner, LLP

(57) ABSTRACT

This disclosure relates to monitoring of machines having one or more vibrating objects. Conventional systems that address the technical problem of detecting frequency of vibrating objects are expensive, require manual intervention, sometimes depend on prior knowledge of location of faults or involve high convergence time. Systems and methods of the present disclosure provide a cost-effective and fully automated solution that employ multiple strobe sources along with a low cost camera. Besides being cost-effective and automated, the solution also reduces convergence time significantly. Employing multiple strobe sources enables generating multiple strobing frequencies in a single iteration. The strobing frequency is a configured to be a multiple of a camera frame rate selected from a set of camera frame
(Continued)

rates having mutually prime elements to ensure faster convergence compared to the art.

8 Claims, 5 Drawing Sheets

(58) Field of Classification Search
USPC .......................................................... 348/138
See application file for complete search history.

(56) References Cited

U.S. PATENT DOCUMENTS

| | | | |
|---|---|---|---|
| 2012/0019654 A1* | 1/2012 | Venkatesan | G01B 11/2509 348/142 |
| 2013/0329953 A1* | 12/2013 | Schreier | G06T 7/579 382/103 |
| 2018/0283847 A1* | 10/2018 | Hatahori | G01M 7/025 |
| 2019/0033124 A1 | 1/2019 | Mukherjee et al. | |

OTHER PUBLICATIONS

Misra et al., Unobtrusive Vibration Sensing using Optical Strobing: Performance Analysis, 2017, Eleventh International Conference on Sensing Technology (ICST), pp. 1-4. (Year: 2017).*

* cited by examiner

UNOBTRUSIVE AND AUTOMATED DETECTION OF FREQUENCY OF VIBRATING OBJECTS USING MULTIPLE STROBE SOURCES

PRIORITY CLAIM

This U.S. patent application claims priority under 35 U.S.C. § 119 to: Indian Patent Application No. 201921001769, filed on 27 Jan. 2019. The entire contents of the aforementioned application are incorporated herein by reference.

TECHNICAL FIELD

The disclosure herein generally relates to vibration detection, and more particularly, to systems and computer implemented methods for unobtrusive and automated detection of frequency of vibrating objects using multiple strobe sources.

BACKGROUND

A typical workstation has a collection of different vibrating or moving parts. Likewise, a large machine body may have spatially distributed vibrating zones or parts. To detect the exact location and frequency of vibration of each vibrating part is crucial either for routine monitoring or fault detection.

Current solutions use either high frames per second (FPS) industrial grade camera or stroboscopes tuned at one particular frequency. Manual stroboscopes are also in use, which require manual intervention for objects moving at different speeds with high convergence time. Point-lasers have been used in some conventional systems for which prior knowledge of exact location of faults are to be known. Again, some state of the art employ point-by-point scanning of a large machine body which takes up a lot of time.

SUMMARY

Embodiments of the present disclosure present technological improvements as solutions to one or more of the above-mentioned technical problems recognized by the inventors in conventional systems.

In an aspect, there is provided a processor implemented method for detecting frequency of one or more vibrating objects using multiple strobe sources, the method comprising the steps of: illuminating one or more vibrating objects, concurrently by a predefined number of strobe sources having a corresponding operating frequency forming a set of strobing frequencies $[\omega_{si}]$, wherein the operating frequency of each of the strobe sources is a unique multiple of a base frequency being a camera frame rate selected from a set of camera frame rates $[\omega_{camj}]$ associated with a camera, wherein elements of the set of camera frame rates $[\omega_{camj}]$ are mutually prime; iteratively performing for each camera frame rate serving as the base frequency from the set of camera frame rates $[\omega_{camj}]$: capturing by the camera, a video having a predetermined length, of the one or more vibrating objects, when illuminated concurrently by the multiple strobe sources; processing, by one or more hardware processors, the captured video to obtain a set of observed frequencies of vibration $[m_k]$, wherein each element thereof corresponds to one of the one or more vibrating objects; and obtaining, by the one or more hardware processors, a set of potential frequencies $[w_k]$ of the one or more vibrating objects using the set of camera frame rates $[\omega_{camj}]$ and the set of observed frequencies of vibration $[m_k]$; obtaining, by the one or more hardware processors, a set $[C_{11}]$ of common potential frequencies between the set of potential frequencies $[w_k]$ obtained for each camera frame rate from the set of camera frame rates $[\omega_{camj}]$; and detecting, by the one or more hardware processors, frequency of the one or more vibrating objects by: associating elements of the set $[C_{11}]$ of common potential frequencies as a vibration frequency corresponding to the one or more vibrating objects if the cardinality of the set $[C_{11}]$ is equal to the number of the one or more vibrating objects; or iteratively performing: identifying a camera frame rate from the set of camera frame rates $[\omega_{camj}]$ having a maximum variation between the cardinality of the set $[C_{11}]$ and the number of the one or more vibrating objects by analyzing kurtosis of the set $[C_{11}]$; and obtaining the set $[C_{11}]$ of common potential frequencies between the set of potential frequencies $[w_k]$ obtained for each camera frame rate from the set of camera frame rates $[\omega_{camj}]$; until the cardinality of the set $[C_{11}]$ is equal to the number of the one or more vibrating objects.

In another aspect, there is provided a system for detecting frequency of one or more vibrating objects using multiple strobe sources, the system comprising: a predefined number of strobe sources configured to illuminate one or more vibrating objects currently, the strobe sources having a corresponding operating frequency forming a set of strobing frequencies $[\omega_{si}]$, wherein the operating frequency of each of the strobe sources is a unique multiple of a base frequency being a camera frame rate selected from a set of camera frame rates $[\omega_{camj}]$ associated with a camera, wherein elements of the set of camera frame rates $[\omega_{camj}]$ are mutually prime; the camera configured to capture a video having a predetermined length, of the one or more vibrating objects, when illuminated concurrently by the multiple strobe sources; a controller in communication with each of the multiple strobe sources and the camera, wherein the controller comprises: one or more data storage devices operatively coupled to one or more hardware processors and configured to store instructions configured for execution by the one or more hardware processors to: iteratively perform for each camera frame rate serving as the base frequency from the set of camera frame rates $[\omega_{camj}]$: processing the captured video to obtain a set of observed frequencies of vibration $[m_k]$, wherein each element thereof corresponds to one of the one or more vibrating objects; and obtaining a set of potential frequencies $[w_k]$ of the one or more vibrating objects using the set of camera frame rates $[\omega_{camj}]$ and the set of observed frequencies $[m_k]$; obtain, a set $[C_{11}]$ of common potential frequencies between the set of potential frequencies $[w_k]$ obtained for each camera frame rate from the set of camera frame rates $[\omega_{camj}]$; detect frequency of the one or more vibrating objects by: associating elements of the set $[C_{11}]$ of common potential frequencies as a vibration frequency corresponding to the one or more vibrating objects if the cardinality of the set $[C_{11}]$ is equal to the number of the one or more vibrating objects; or iteratively perform: identifying a camera frame rate from the set of camera frame rates $[\omega_{camj}]$ having a maximum variation between the cardinality of the set $[C_{11}]$ and the number of the one or more vibrating objects by analyzing kurtosis of the set $[C_{11}]$; and obtaining the set $[C_{11}]$ of common potential frequencies between the set of potential frequencies $[w_k]$ obtained for each camera frame rate from the set of camera frame rates $[\omega_{camj}]$; until the cardinality of the set $[C_{11}]$ is equal to the number of the one or more vibrating objects.

In accordance with an embodiment of the present disclosure, the number of strobe sources is predefined such that the one or more vibrating objects are under coverage of the multiple strobe sources.

In accordance with an embodiment of the present disclosure, the predetermined length of the video is 1 second.

In accordance with an embodiment of the present disclosure, the one or more processors are further configured to obtain the set of potential frequencies $[w_k]$ of the one or more vibrating objects by: generating a first matrix $w_{est1}(i,j)$ of evaluated frequencies of the one or more vibrating objects based on each camera frame rate selected from the set of camera frame rates $[\omega_{camj}]$ and each observed frequency from the set of observed frequencies of vibration $[m_k]$; generating a second matrix $w_{est2}(i,j)$, of evaluated frequencies of the one or more vibrating objects based on each camera frame rate selected from the set of camera frame rates $[\omega_{camj}]$ and each observed frequency from the set of observed frequencies of vibration $[m_k]$; and concatenating the first matrix $w_{est1}(i,j)$ and the second matrix $w_{est2}(i,j)$ to obtain the set of potential frequencies $[w_k]$.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
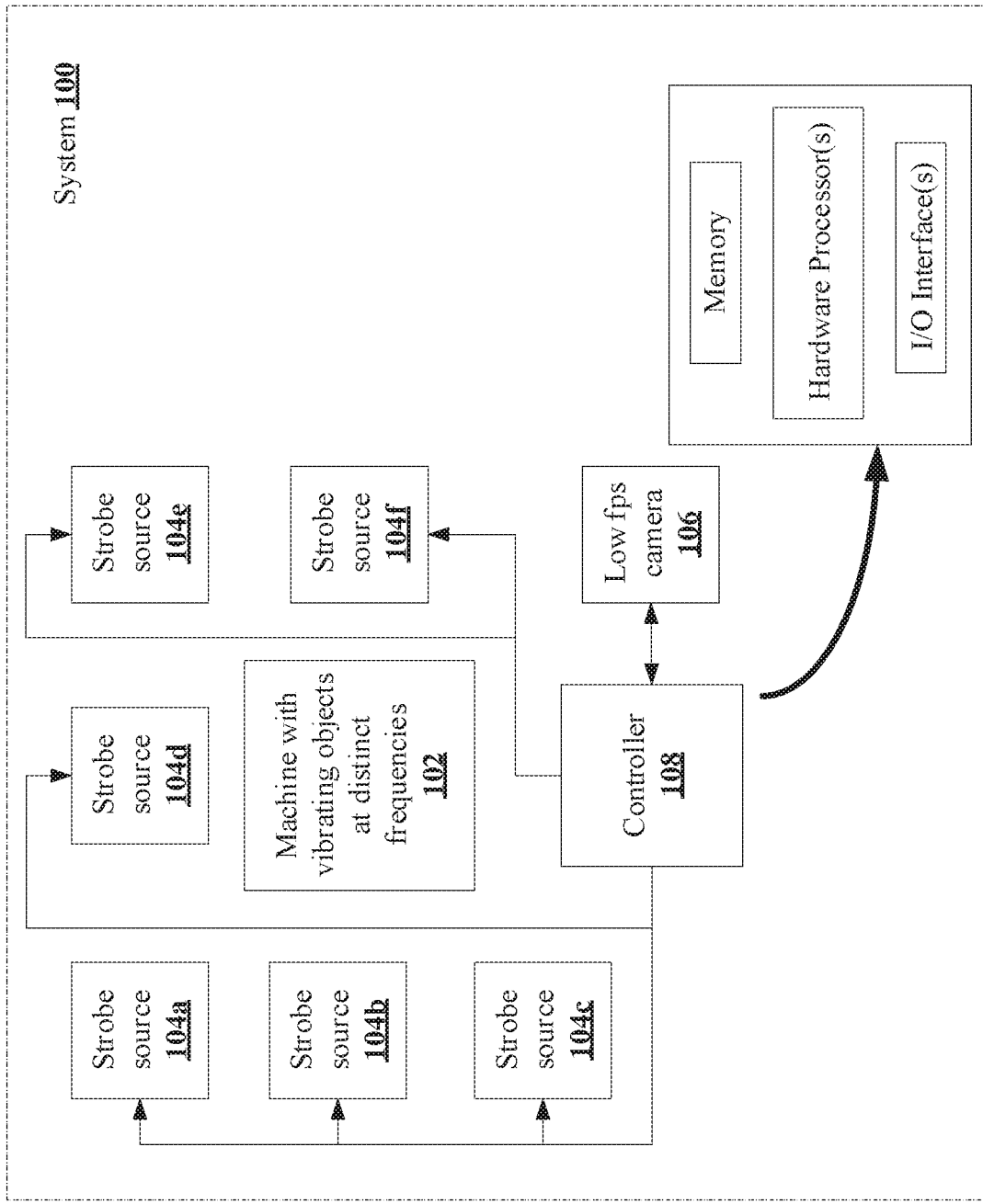
FIG. 1 illustrates an exemplary block diagram of a system for detecting frequency of one or more vibrating objects using multiple strobe sources, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Complete Description of Embodiments

Conventional systems that address the technical problem of detecting frequency of vibrating objects are expensive, require manual intervention, sometimes depend on prior knowledge of location of faults or involve high convergence time. Systems and methods of the present disclosure provide a cost-effective and fully automated solution that employs multiple strobe sources along with a low cost camera. In an embodiment, the camera employed is a 30 frames per second ordinary optical camera. Besides being cost-effective and automated, the solution also reduces convergence time significantly as explained later in the description.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for detecting frequency of one or more vibrating objects using multiple strobe sources, in accordance with an embodiment of the present disclosure. A machine comprising one or more vibrating objects is generally referenced as 102. In an embodiment, the system 100 includes multiple strobe sources 104a-104f, an ordinary camera 106 and a controller 108. In an embodiment the controller comprises one or more processors (not referenced), communication interface device(s) or input/output (I/O) interface(s) (not referenced), and one or more data storage devices or memory (not referenced) operatively coupled to the one or more processors. The one or more processors that are hardware processors may be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) may include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes.

Figure 2A:
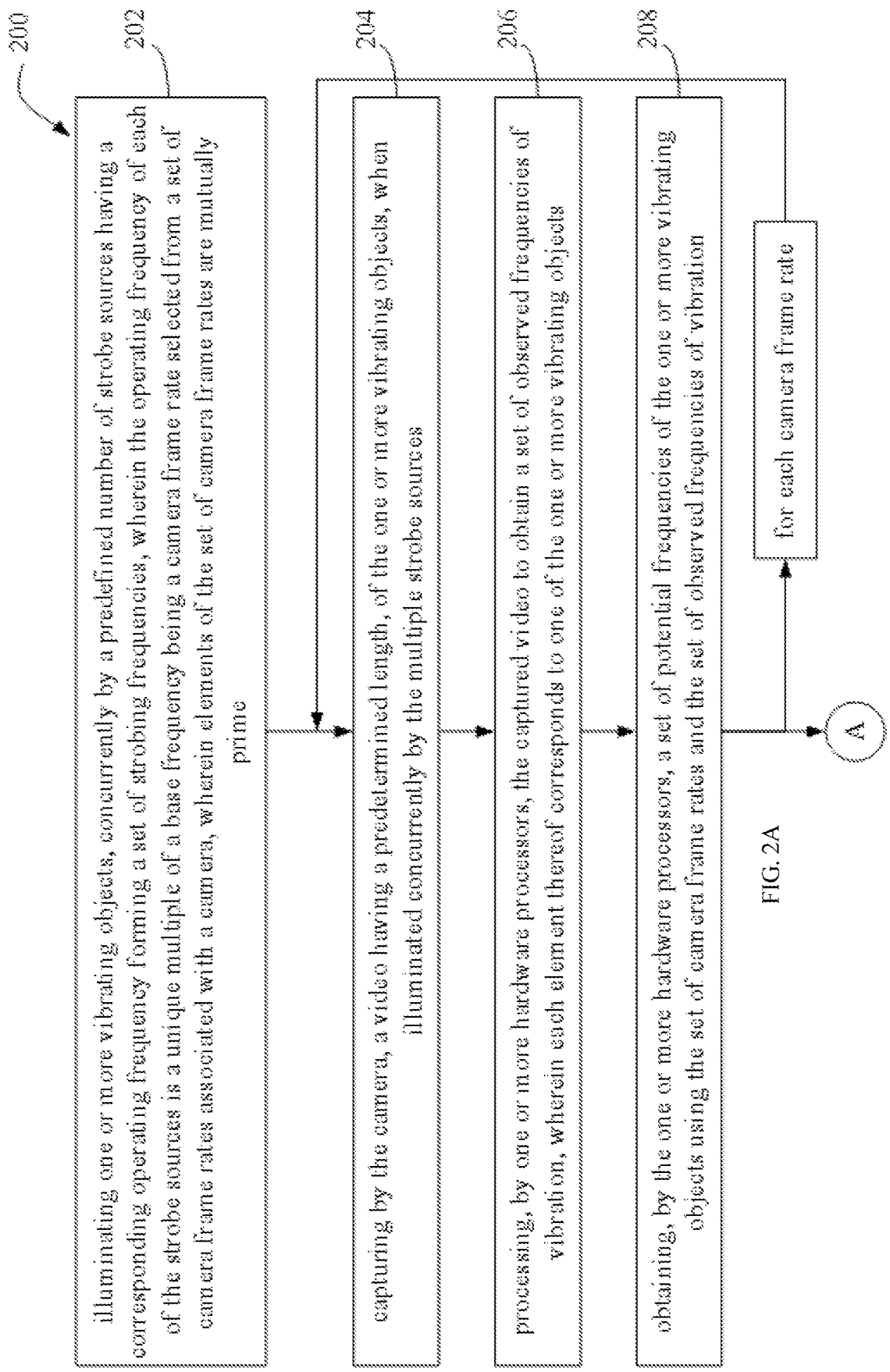
FIG. 2A through FIG. 2B illustrates an exemplary flow diagram of a computer implemented method for detecting frequency of one or more vibrating objects using multiple strobe sources, in accordance with an embodiment of the present disclosure.
Figure 2B:
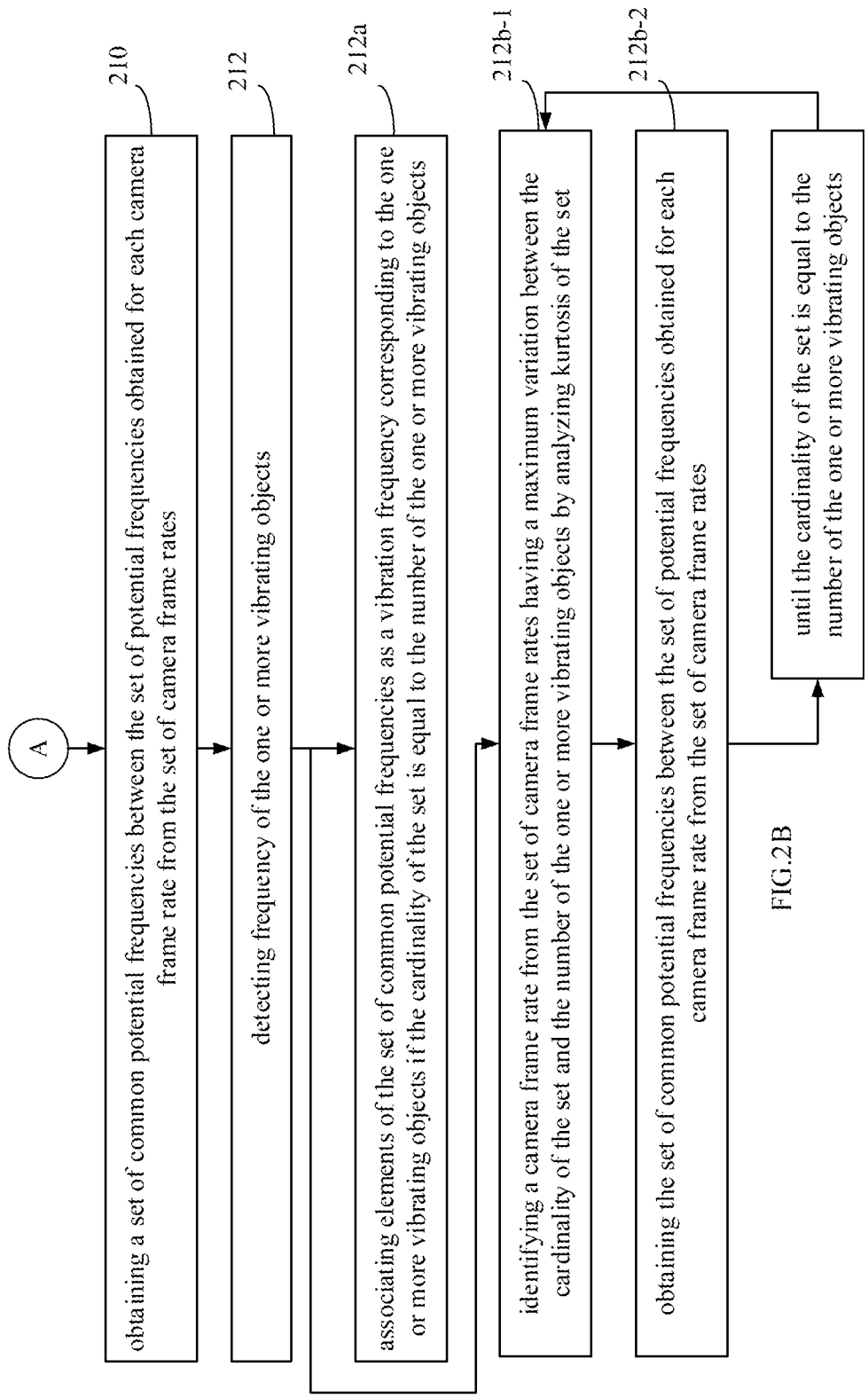

FIG. 2A through FIG. 2B illustrates an exemplary flow diagram for a computer implemented method 200 for detecting frequency of one or more vibrating objects using multiple strobe sources, in accordance with an embodiment of the present disclosure. In an embodiment, the system 100 includes one or more data storage devices or memory operatively coupled to the one or more processors and is configured to store instructions configured for execution of one or more steps of the method 200. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, at step 202, the one or more vibrating objects are illuminated concurrently by a predefined number of strobe sources 104a-104f having a corresponding operating frequency forming a set of strobing frequencies $[\omega_{si}]$, wherein i represents the number of the one or more vibrating objects. In the illustrated embodiment, 6 strobe sources are provided. The number of strobe sources is predefined such that the one or more vibrating objects are under coverage of the multiple strobe sources. Accordingly, the more spatially distributed the vibrating objects are or larger the machine or more the number of vibrating objects result in more number of strobe sources. The one or more vibrating objects may be parts of a single machine 102 being monitored such as in the illustrated example. In an embodiment, the operating frequency of each of the strobe sources 104a-104f is a unique multiple of a base frequency, wherein the base frequency is a camera frame rate selected from a set of camera frame rates $[\omega_{camj}]$ associated with the camera 106, wherein elements of the set of camera frame rates $[\omega_{camj}]$ are mutually prime. Configuring the camera frame rates to be mutually prime or co-prime numbers enables the method of the present disclosure to converge.

In accordance with the present disclosure, the strobing frequency $(\omega_{si})$ is a multiple of a camera frame rate $[\omega_{camj}]$. Alternately, the strobing frequency $(\omega_{si})$ may be represented as: $\omega_{si}=(i+1)\times\omega_{camj}$; wherein i is a positive integer. Configuring the strobing frequency as a multiple of the camera frame rate, in accordance with the present disclosure, nullifies an aliasing component, that may otherwise have existed.

In an embodiment, for each camera frame rate serving as the base frequency, steps 204 through 208 are performed iteratively. At step 204, a video of the one or more vibrating objects is captured when illuminated concurrently by the multiple strobe sources. In accordance with the present disclosure, the video has a predetermined length, for instance 1 second.

In an embodiment, the one or more hardware processors of the controller 108 are configured to process, at step 206, the captured video to obtain a set of observed frequencies of vibration $[m_k]$, wherein each element thereof corresponds to one of the one or more vibrating objects. The processing of the captured video may be performed by any image processing method known in the art such as disclosed in Indian Patent Application 201721027017 titled 'Autonomous Stroboscopic Machine Inspection for Multi-point and Multi-Frequency Vibration Measurement' or European patent EP2384423B1 titled 'Measurement of vibration characteristics of an object'. An exemplary image processing method disclosed in EP2384423B1 involves determining positions of feature points on the vibrating object in different color channels of the image to calculate frequency of each point in a point set of the vibrating object.

In an embodiment, the one or more hardware processors of the controller 108 are configured to obtain, at step 208, a set of potential frequencies $[w_k]$ of the one or more vibrating objects using the set of camera frame rates $[\omega_{camj}]$ and the set of observed frequencies $[m_k]$. In an embodiment, the step of obtaining a set of potential frequencies $[w_k]$ of the one or more vibrating objects comprises firstly generating a first matrix w and a second matrix $w_{est2}(i,j)$ of evaluated frequencies of the one or more vibrating objects based on each camera frame rate selected from the set of camera frame rates $[\omega_{camj}]$ and each observed frequency from the set of observed frequencies of vibration $[m_k]$. The first matrix and the second matrix of the present disclosure may be represented as:

$w_{est1}(i,j)=\omega_{cam}\times i+m(:,j)$; and $w_{est2}(i,j)=\omega_{cam}\times i-m(:,j)$ respectively.

In an embodiment, the one or more hardware processors of the controller 108 are configured to concatenate the first matrix $w_{est1}(i,j)$ and the second matrix $w_{est2}(i,j)$ to obtain the set of potential frequencies $[w_k]$.

In an embodiment, the one or more hardware processors of the controller 108 are configured to obtain, at step 210, a set $[C_{11}]$ of common potential frequencies between the set of potential frequencies $[w_k]$ obtained for each camera frame rate from the set of camera frame rates $[\omega_{camj}]$.

In an embodiment, the one or more hardware processors of the controller 108 are configured to detect frequency of the one or more vibrating objects, at step 212. There may be two scenarios after the set $[C_{11}]$ of common potential frequencies is obtained. A first scenario involves the cardinality of the set $[C_{11}]$ being equal to the number of the one or more vibrating objects. In case of the first scenario, the elements of the set $[C_{11}]$ of common potential frequencies are identified as the vibration frequency of the one or more vibrating objects at step 212a. To further detect the actual one-to-one mapping of each element of the set $[C_{11}]$ to the one or more vibrating objects, a marker based image processing may be performed as disclosed in the Applicant's earlier patent application no. 201821015512 titled 'Unobtrusive And Automated Detection Of Frequencies Of Spatially Located Distinct Parts Of A Machine'.

A second scenario involves the cardinality of the set $[C_{11}]$ being greater than the number of the one or more vibrating objects. In case of the second scenario, the steps 212b-1 and 212b-2 described below are iteratively performed until the cardinality of the set $[C_{11}]$ is equal to the number of the one or more vibrating objects. In an embodiment, at step 212b-1, a camera frame from the set of camera frame rates $[\omega_{camj}]$ having a maximum variation between the cardinality of the set $[C_{11}]$ and the number of the one or more vibrating objects by analyzing kurtosis of the set $[C_{11}]$ is identified. Then at step 212b-2, the set $[C_{11}]$ of common potential frequencies between the set of potential frequencies $[w_k]$ obtained for each camera frame rate from the set of camera frame rates $[\omega_{camj}]$ is obtained. If the cardinality of the set $[C_{11}]$ is equal to the number of the one or more vibrating objects, then the elements of the set $[C_{11}]$ of common potential frequencies are identified as the vibration frequency of the one or more vibrating objects as indicated in step 212a.

Experimental Data and Validation

In accordance with the Applicant's previous Indian patent application 201721027017 titled 'Autonomous Stroboscopic Machine Inspection for Multi-point and Multi-Frequency Vibration Measurement', strobe frequencies are prime or $(\omega_{si})\in$Prime, Then using Chinese Remainder Theorem (CRT), the vibrating frequencies were detected. Since this was a sequential approach, the prime frequency was required to be set in each iteration until the frequencies of all the vibrating objects were detected. Moreover, since the vibration information is unknown, the strobing had to begin from a very low prime value. Also, the observed frequency $m_k$ for a typical strobe frequency $\omega_{si}$ can have two possible combinations:

$$m_k = \begin{cases} \omega - K\omega_{si} & \text{Normal condition} \\ |\omega - K\omega_{si}| - \omega_{cam} & \text{Frequency folding} \end{cases}$$

This resulted in a large convergence time when determining frequencies using CRT. To overcome the challenges mentioned above, multiple strobe sources are used in the present disclosure and $\omega_{si}$ is computed from $\omega_{cam}$. Reduced number of iterations and observed frequencies being same for any value of strobe frequency, result in a significantly reduced convergence time.

Experiment 1: Detecting Frequency of a Single Vibrating Object.

Say the unknown vibration frequency is $\omega=100$ Hz and the vibrating object is illuminated by a set of strobe strobing frequencies $[\omega_{si}]$ which are multiples of camera frame rate $\omega_{cam}=30$ fps; hence $\omega_{si}=[60, 90, 120, 150, 180, 210]$.

Figure 3:
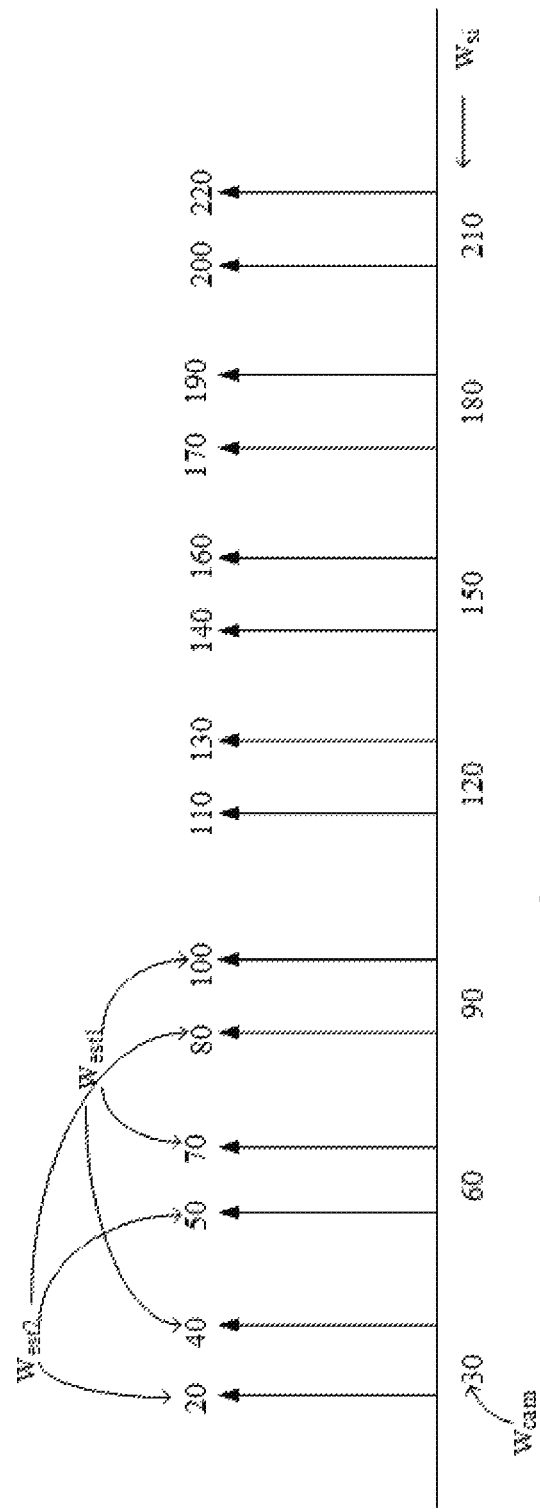
FIG. 3 illustrates an exemplary representation of evaluated frequencies for an exemplary value of camera frame rate in a scenario involving a single vibrating object, in accordance with an embodiment of the present disclosure.

Step 1:

$\omega_{cam}=30$ fps and strobing frequencies are $\omega_{si}=[60, 90, 120, 150, 180, 210]$, the observed frequency $m_1=10$ Hz. FIG. 3 illustrates an exemplary representation of evaluated frequencies for an exemplary value of camera frame rate, $\omega_{cam}=30$ fps, in a scenario involving a single vibrating object, in accordance with an embodiment of the present disclosure.

It may be observed that for any observed frequency $m_1$, there are six possibilities:
1. Positive shift; $\omega=(i \times \omega_s + m_1)$;
2. Negative shift; $\omega=(i \times \omega_s - m_1)$;
3. Next positive frequency folding; $\omega=(i \times \omega_s + m_1) + \omega_{cam}$
4. Next negative frequency folding; $w=(i \times \omega_s - m_1) - \omega_{cam}$
5. Previous positive frequency folding; $w=(i \times \omega_s + m_1) - \omega_{cam}$
6. Previous negative frequency folding; $w=(i \times \omega_s - m_1) - \omega_{cam}$ It may be observed from FIG. 3 that the frequency folding phenomena is just a next multiple or a previous multiple frequency shift which can be approximated by the equations in possibilities 1. and 2. above which is an important consideration because it reduces computation complexity.

Figure 4:
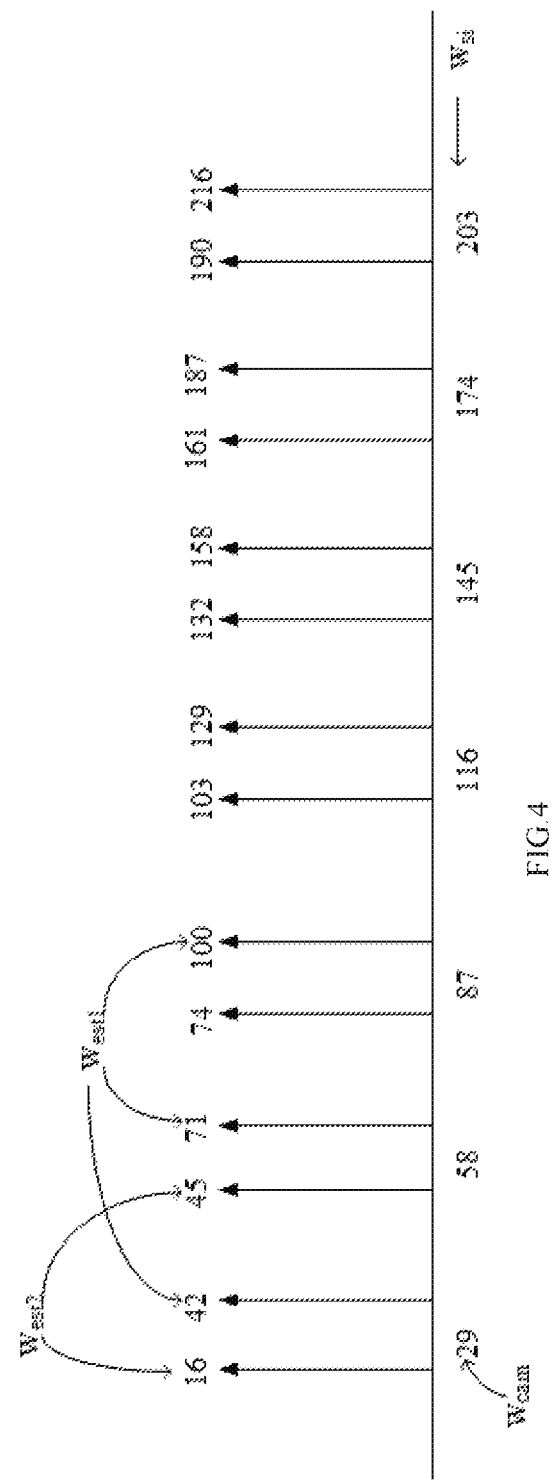
FIG. 4 illustrates an exemplary representation of evaluated frequencies for another exemplary value of camera frame rate in a scenario involving a single vibrating object, in accordance with an embodiment of the present disclosure.

Step 2:

In order to approximate the unknown vibration frequency, the camera fps is changed. $\omega_{cam}=29$ fps and strobing frequencies are $\omega_{si}=[29, 58, 87, 116, 145, 174, 203]$, the observed frequency $m_1=13$ Hz. FIG. 4 illustrates an exemplary representation of evaluated frequencies for another exemplary value of camera frame rate, $\omega_{cam}=29$ fps in a scenario involving a single vibrating object, in accordance with an embodiment of the present disclosure.

From Step 1 and Step 2, it may be observed that there is single unique repetition of the unknown frequency. It may be also be noted that the $\omega_{cam}=30$ fps of Step 1 and $\omega_{cam}=29$ fps of Step 2 are mutually prime or co-prime numbers.

Results and Observations:

It may be noted from the below results and observations that for single frequency detection, time taken by the method of the present disclosure and the conventional CRT based method when the frequency is 61 Hz is same. However as frequency of vibration increases and as the number of frequencies to be detected increases, the method of present disclosure takes significantly lower time to converge.

| Frequencies in Hertz (Hz) | Method of the present disclosure | | CRT based method (Prior art) | |
|---|---|---|---|---|
| | Iterations to Converge | Time taken (in seconds) | Iterations to Converge | Time taken (in seconds) |
| Single Frequency Detection | | | | |
| [61] | 2 | 49 | 2 | 49 |
| [126] | 2 | 49 | 4 | 53 |
| [303] | 3 | 51 | 7 | 74.2 |
| Dual Frequency Detection | | | | |
| [61, 75] | 4 | 53 | 5 | 55 |
| [83, 95] | 4 | 53 | 6 | 65 |
| [61, 122] | 5 | 56 | 8 | 82 |
| [61, 213] | 3 | 51 | 10 | 99.9 |
| [61, 515] | 3 | 51 | 16 | 178.5 |
| Triple Frequency Detection | | | | |
| [65, 80, 100] | 4 | 53 | 7 | 74.2 |
| [65, 150, 215] | 4 | 53 | 12 | 129 |
| [65, 130, 260] | 6 | 65 | 14 | 136 |
| Quad Frequency Detection | | | | |
| [65, 150, 215, 313] | 4 | 53 | 8 | 82 |
| [100, 130, 200, 490] | 6 | 65 | 19 | 187.4 |
| 5 Frequency Detection | | | | |
| [61, 122, 213, 515, 661] | 7 | 74.2 | 25 | 243 |
| 6 Frequency Detection | | | | |
| [52, 104, 249, 298, 386, 511] | 7 | 74.2 | 37 | 488.3 |

Experiment 2: Detecting Frequency of Two Vibrating Objects

Say the unknown vibration frequencies of the two vibrating objects are $\omega=61, 515$ Hz and the vibrating objects are illuminated by a set of strobe strobing frequencies $[\omega_{si}]$ which are multiples of camera frame rate $\omega_{cam}=29$ fps; Hence $\omega_{si}=[2*29, 3*29, 4*29, 5*29, 6*29, 7*29]=[58, 87, 116, 145, 174, 203]$.

Iteration 1: $\omega_{cam}=29$ fps and strobing frequencies are $\omega_{si}=[58, 87, 116, 145, 174, 203]$, the observed frequencies $m_k=[3, 7]$ Hz. The first matrix $w_{est1}$ and the second matrix $w_{est2}$ of evaluated frequencies of the two vibrating objects may be represented as:

| $w_{est1} =$ | | | | | | | | | | | |
|---|---|---|---|---|---|---|---|---|---|---|---|
| 32 | 61 | 90 | 119 | 148 | 177 | 206 | 235 | 264 | 293 | 322 | 351 |
| 380 | 409 | 438 | 467 | 496 | 525 | 554 | 583 | 612 | 641 | 670 | 699 |
| 728 | 757 | 786 | 815 | 844 | 873 | 902 | 931 | 960 | 989 | 1018 | 1047 |
| 1076 | 1105 | 1134 | 1163 | 1192 | 1221 | 1250 | 1279 | 1308 | 1337 | 1366 | 1395 |
| 1424 | 1453 | 36 | 65 | 94 | 123 | 152 | 181 | 210 | 239 | 268 | 297 |
| 326 | 355 | 384 | 413 | 442 | 471 | 500 | 529 | 558 | 587 | 616 | 645 |
| 674 | 703 | 732 | 761 | 790 | 819 | 848 | 877 | 906 | 935 | 964 | 993 |

-continued

| | | | | | | | | | | | |
|---|---|---|---|---|---|---|---|---|---|---|---|
| 1022 | 1051 | 1080 | 1109 | 1138 | 1167 | 1196 | 1225 | 1254 | 1283 | 1312 | 1341 |
| 1370 | 1399 | 1428 | 1457 | | | | | | | | |

| $w_{est2}$ = | | | | | | | | | | | |
|---|---|---|---|---|---|---|---|---|---|---|---|
| 26 | 55 | 84 | 113 | 142 | 171 | 200 | 229 | 258 | 287 | 316 | 345 |
| 374 | 403 | 432 | 461 | 490 | 519 | 548 | 577 | 606 | 635 | 664 | 693 |
| 722 | 751 | 780 | 809 | 838 | 867 | 896 | 925 | 954 | 983 | 1012 | 1041 |
| 1070 | 1099 | 1128 | 1157 | 1186 | 1215 | 1244 | 1273 | 1302 | 1331 | 1360 | 1389 |
| 1418 | 1447 | 22 | 51 | 80 | 109 | 138 | 167 | 196 | 225 | 254 | 283 |
| 312 | 341 | 370 | 399 | 428 | 457 | 486 | 515 | 544 | 573 | 602 | 631 |
| 660 | 689 | 718 | 747 | 776 | 805 | 834 | 863 | 892 | 921 | 950 | 979 |
| 1008 | 1037 | 1066 | 1095 | 1124 | 1153 | 1182 | 1211 | 1240 | 1269 | 1298 | 1327 |
| 1356 | 1385 | 1414 | 1443 | | | | | | | | |

Concatenate $w_{est1}$ and $w_{est2}$ in a new variable $w_1$ (potential frequencies)

| $w_1$ = | | | | | | | | | | | |
|---|---|---|---|---|---|---|---|---|---|---|---|
| 22 | 26 | 32 | 36 | 51 | 55 | 61 | 65 | 80 | 84 | 90 | 94 |
| 109 | 113 | 119 | 123 | 138 | 142 | 148 | 152 | 167 | 171 | 177 | 181 |
| 196 | 200 | 206 | 210 | 225 | 229 | 235 | 239 | 254 | 258 | 264 | 268 |
| 283 | 287 | 293 | 297 | 312 | 316 | 322 | 326 | 341 | 345 | 351 | 355 |
| 370 | 374 | 380 | 384 | 399 | 403 | 409 | 413 | 428 | 432 | 438 | 442 |
| 457 | 461 | 467 | 471 | 486 | 490 | 496 | 500 | 515 | 519 | 525 | 529 |
| 544 | 548 | 554 | 558 | 573 | 577 | 583 | 587 | 602 | 606 | 612 | 616 |
| 631 | 635 | 641 | 645 | 660 | 664 | 670 | 674 | 689 | 693 | 699 | 703 |
| 718 | 722 | 728 | 732 | 747 | 751 | 757 | 761 | 776 | 780 | 786 | 790 |
| 805 | 809 | 815 | 819 | 834 | 838 | 844 | 848 | 863 | 867 | 873 | 877 |
| 892 | 896 | 902 | 906 | 921 | 925 | 931 | 935 | 950 | 954 | 960 | 964 |
| 979 | 983 | 989 | 993 | 1008 | 1012 | 1018 | 1022 | 1037 | 1041 | 1047 | 1051 |
| 1066 | 1070 | 1076 | 1080 | 1095 | 1099 | 1105 | 1109 | 1124 | 1128 | 1134 | 1138 |
| 1153 | 1157 | 1163 | 1167 | 1182 | 1186 | 1192 | 1196 | 1211 | 1215 | 1221 | 1225 |
| 1240 | 1244 | 1250 | 1254 | 1269 | 1273 | 1279 | 1283 | 1298 | 1302 | 1308 | 1312 |
| 1327 | 1331 | 1337 | 1341 | 1356 | 1360 | 1366 | 1370 | 1385 | 1389 | 1395 | 1399 |
| 1414 | 1418 | 1424 | 1428 | 1443 | 1447 | 1453 | 1457 | | | | |

Iteration 2: $\omega_{cam}$=27 fps and strobing frequencies are $\omega_{si}$=[54, 81, 108, 135, 162, 189], the observed frequencies $m_k$=[2, 7] Hz. The first matrix $w_{est1}$ and the second matrix $w_{est2}$ of evaluated frequencies of the two vibrating objects may be represented as:

| $w_{est1}$ = | | | | | | | | | | | |
|---|---|---|---|---|---|---|---|---|---|---|---|
| 29 | 56 | 83 | 110 | 137 | 164 | 191 | 218 | 245 | 272 | 299 | 326 |
| 353 | 380 | 407 | 434 | 461 | 488 | 515 | 542 | 569 | 596 | 623 | 650 |
| 677 | 704 | 731 | 758 | 785 | 812 | 839 | 866 | 893 | 920 | 947 | 974 |
| 1001 | 1028 | 1055 | 1082 | 1109 | 1136 | 1163 | 1190 | 1217 | 1244 | 1271 | 1298 |
| 1325 | 1352 | 34 | 61 | 88 | 115 | 142 | 169 | 196 | 223 | 250 | 277 |
| 304 | 331 | 358 | 385 | 412 | 439 | 466 | 493 | 520 | 547 | 574 | 601 |
| 628 | 655 | 682 | 709 | 736 | 763 | 790 | 817 | 844 | 871 | 898 | 925 |
| 952 | 979 | 1006 | 1033 | 1060 | 1087 | 1114 | 1141 | 1168 | 1195 | 1222 | 1249 |
| 1276 | 1303 | 1330 | 1357 | | | | | | | | |

| $w_{est2}$ = | | | | | | | | | | | |
|---|---|---|---|---|---|---|---|---|---|---|---|
| 25 | 52 | 79 | 106 | 133 | 160 | 187 | 214 | 241 | 268 | 295 | 322 |
| 349 | 376 | 403 | 430 | 457 | 484 | 511 | 538 | 565 | 592 | 619 | 646 |
| 673 | 700 | 727 | 754 | 781 | 808 | 835 | 862 | 889 | 916 | 943 | 970 |
| 997 | 1024 | 1051 | 1078 | 1105 | 1132 | 1159 | 1186 | 1213 | 1240 | 1267 | 1294 |
| 1321 | 1348 | 20 | 47 | 74 | 101 | 128 | 155 | 182 | 209 | 236 | 263 |
| 290 | 317 | 344 | 371 | 398 | 425 | 452 | 479 | 506 | 533 | 560 | 587 |
| 614 | 641 | 668 | 695 | 722 | 749 | 776 | 803 | 830 | 857 | 884 | 911 |
| 938 | 965 | 992 | 1019 | 1046 | 1073 | 1100 | 1127 | 1154 | 1181 | 1208 | 1235 |
| 1262 | 1289 | 1316 | 1343 | | | | | | | | |

Concatenate $w_{est1}$ and $w_{est2}$ in a new variable $w_2$ (potential frequencies)

| | | | | | $w_2 =$ | | | | | | |
|---|---|---|---|---|---|---|---|---|---|---|---|
| 20 | 25 | 29 | 34 | 47 | 52 | 56 | 61 | 74 | 79 | 83 | 88 |
| 101 | 106 | 110 | 115 | 128 | 133 | 137 | 142 | 155 | 160 | 164 | 169 |
| 182 | 187 | 191 | 196 | 209 | 214 | 218 | 223 | 236 | 241 | 245 | 250 |
| 263 | 268 | 272 | 277 | 290 | 295 | 299 | 304 | 317 | 322 | 326 | 331 |
| 344 | 349 | 353 | 358 | 371 | 376 | 380 | 385 | 398 | 403 | 407 | 412 |
| 425 | 430 | 434 | 439 | 452 | 457 | 461 | 466 | 479 | 484 | 488 | 493 |
| 506 | 511 | 515 | 520 | 533 | 538 | 542 | 547 | 560 | 565 | 569 | 574 |
| 587 | 592 | 596 | 601 | 614 | 619 | 623 | 628 | 641 | 646 | 650 | 655 |
| 668 | 673 | 677 | 682 | 695 | 700 | 704 | 709 | 722 | 727 | 731 | 736 |
| 749 | 754 | 758 | 763 | 776 | 781 | 785 | 790 | 803 | 808 | 812 | 817 |
| 830 | 835 | 839 | 844 | 857 | 862 | 866 | 871 | 884 | 889 | 893 | 898 |
| 911 | 916 | 920 | 925 | 938 | 943 | 947 | 952 | 965 | 970 | 974 | 979 |
| 992 | 997 | 1001 | 1006 | 1019 | 1024 | 1028 | 1033 | 1046 | 1051 | 1055 | 1060 |
| 1073 | 1078 | 1082 | 1087 | 1100 | 1105 | 1109 | 1114 | 1127 | 1132 | 1136 | 1141 |
| 1154 | 1159 | 1163 | 1168 | 1181 | 1186 | 1190 | 1195 | 1208 | 1213 | 1217 | 1222 |
| 1235 | 1240 | 1244 | 1249 | 1262 | 1267 | 1271 | 1276 | 1289 | 1294 | 1298 | 1303 |
| 1316 | 1321 | 1325 | 1330 | 1343 | 1348 | 1352 | 1357 | | | | |

Common potential frequencies between $w_1$ and $w_2$ are

| | | | | | $C_{11} =$ | | | | | | |
|---|---|---|---|---|---|---|---|---|---|---|---|
| 61 | 142 | 196 | 268 | 322 | 326 | 380 | 403 | 457 | 461 | 515 | 587 |
| 641 | 722 | 776 | | | | | | | | | |

Cardinality of the set $[C_{11}]=15$ which is greater than the number of vibrating objects in this case being 2 ($\omega=61, 515$ Hz).
Hence it is required to identify a camera frame rate $\omega_{cam}$ having a maximum variation.
After analyzing the kurtosis of $C_{11}$ for each $\omega_{cam}=[30, 25, 23, 21, 19]$, the variation results are:
19.1238095238095 14.0952380952381 14.8285714285714 11.3142857142857 5.98095238095238
Hence, maximum variation occurs for $\omega_{cam}=30$ fps.

Iteration 3: $\omega_{cam}=30$ fps and strobing frequencies are $\omega_{si}=[60, 90, 120, 150, 180, 210]$, the observed frequencies $m_k=[1, 5]$ Hz. The first matrix $w_{est1}$ and the second matrix $w_{est2}$ of evaluated frequencies of the two vibrating objects may be represented as:

| | | | | | $w_{est1} =$ | | | | | | |
|---|---|---|---|---|---|---|---|---|---|---|---|
| 31 | 61 | 91 | 121 | 151 | 181 | 211 | 241 | 271 | 301 | 331 | 361 |
| 391 | 421 | 451 | 481 | 511 | 541 | 571 | 601 | 631 | 661 | 691 | 721 |
| 751 | 781 | 811 | 841 | 871 | 901 | 931 | 961 | 991 | 1021 | 1051 | 1081 |
| 1111 | 1141 | 1171 | 1201 | 1231 | 1261 | 1291 | 1321 | 1351 | 1381 | 1411 | 1441 |
| 1471 | 1501 | 35 | 65 | 95 | 125 | 155 | 185 | 215 | 245 | 275 | 305 |
| 335 | 365 | 395 | 425 | 455 | 485 | 515 | 545 | 575 | 605 | 635 | 665 |
| 695 | 725 | 755 | 785 | 815 | 845 | 875 | 905 | 935 | 965 | 995 | 1025 |
| 1055 | 1085 | 1115 | 1145 | 1175 | 1205 | 1235 | 1265 | 1295 | 1325 | 1355 | 1385 |
| 1415 | 1445 | 1475 | 1505 | | | | | | | | |

| | | | | | $w_{est2} =$ | | | | | | |
|---|---|---|---|---|---|---|---|---|---|---|---|
| 29 | 59 | 89 | 119 | 149 | 179 | 209 | 239 | 269 | 299 | 329 | 359 |
| 389 | 419 | 449 | 479 | 509 | 539 | 569 | 599 | 629 | 659 | 689 | 719 |
| 749 | 779 | 809 | 839 | 869 | 899 | 929 | 959 | 989 | 1019 | 1049 | 1079 |
| 1109 | 1139 | 1169 | 1199 | 1229 | 1259 | 1289 | 1319 | 1349 | 1379 | 1409 | 1439 |
| 1469 | 1499 | 25 | 55 | 85 | 115 | 145 | 175 | 205 | 235 | 265 | 295 |
| 325 | 355 | 385 | 415 | 445 | 475 | 505 | 535 | 565 | 595 | 625 | 655 |
| 685 | 715 | 745 | 775 | 805 | 835 | 865 | 895 | 925 | 955 | 985 | 1015 |
| 1045 | 1075 | 1105 | 1135 | 1165 | 1195 | 1225 | 1255 | 1285 | 1315 | 1345 | 1375 |
| 1405 | 1435 | 1465 | 1495 | | | | | | | | |

Concatenate $w_{est1}$ and $w_{est2}$ in a new variable $w_3$ (potential frequencies)

| $w_3 =$ | | | | | | | | | | | |
|---|---|---|---|---|---|---|---|---|---|---|---|
| 25 | 29 | 31 | 35 | 55 | 59 | 61 | 65 | 85 | 89 | 91 | 95 |
| 115 | 119 | 121 | 125 | 145 | 149 | 151 | 155 | 175 | 179 | 181 | 185 |
| 205 | 209 | 211 | 215 | 235 | 239 | 241 | 245 | 265 | 269 | 271 | 275 |
| 295 | 299 | 301 | 305 | 325 | 329 | 331 | 335 | 355 | 359 | 361 | 365 |
| 385 | 389 | 391 | 395 | 415 | 419 | 421 | 425 | 445 | 449 | 451 | 455 |
| 475 | 479 | 481 | 485 | 505 | 509 | 511 | 515 | 535 | 539 | 541 | 545 |
| 565 | 569 | 571 | 575 | 595 | 599 | 601 | 605 | 625 | 629 | 631 | 635 |
| 655 | 659 | 661 | 665 | 685 | 689 | 691 | 695 | 715 | 719 | 721 | 725 |
| 745 | 749 | 751 | 755 | 775 | 779 | 781 | 785 | 805 | 809 | 811 | 815 |
| 835 | 839 | 841 | 845 | 865 | 869 | 871 | 875 | 895 | 899 | 901 | 905 |
| 925 | 929 | 931 | 935 | 955 | 959 | 961 | 965 | 985 | 989 | 991 | 995 |
| 1015 | 1019 | 1021 | 1025 | 1045 | 1049 | 1051 | 1055 | 1075 | 1079 | 1081 | 1085 |
| 1105 | 1109 | 1111 | 1115 | 1135 | 1139 | 1141 | 1145 | 1165 | 1169 | 1171 | 1175 |
| 1195 | 1199 | 1201 | 1205 | 1225 | 1229 | 1231 | 1235 | 1255 | 1259 | 1261 | 1265 |
| 1285 | 1289 | 1291 | 1295 | 1315 | 1319 | 1321 | 1325 | 1345 | 1349 | 1351 | 1355 |
| 1375 | 1379 | 1381 | 1385 | 1405 | 1409 | 1411 | 1415 | 1435 | 1439 | 1441 | 1445 |
| 1465 | 1469 | 1471 | 1475 | 1495 | 1499 | 1501 | 1505 | | | | |

Common potential frequencies between $w_3$ and $C_{11}$ are

| $C_{21} =$ | |
|---|---|
| 61 | 515 |

Cardinality of the set $[C_{21}]=2$ which is equal to the number of vibrating objects in this case being 2 ($\omega=61, 515$ Hz). Hence elements of $C_{21}$ are the vibration frequencies associated with the two vibrating objects under consideration.

Thus systems and methods of the present disclosure provide an automated solution to industrial problems like monitoring of heavy machinery wherein traditionally contact based accelerometer was used. For instance, in a drill bit, thickness of drill bit is critical for cutting precision. To find frequency of vibration of the drill bit, an accelerometer is needed, but that cannot be done. Rotational motion of drill bit will change, so unobtrusive monitoring is needed. The systems of the present disclosure may also be employed for machine fault detection and for monitoring vibrating objects in hazardous environment where it may not be humanly possible to monitor machines physically.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are $\omega_{cam}$ out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for detecting frequency of one or more vibrating objects using multiple strobe sources, the method comprising the steps of:

illuminating one or more vibrating objects, concurrently by a predefined number of strobe sources having a corresponding operating frequency forming a set of strobing frequencies $[\omega_{si}]$, wherein the operating frequency of each of the strobe sources is a unique multiple of a base frequency being a camera frame rate selected from a set of camera frame rates $[\omega_{camj}]$ associated with a camera, wherein elements of the set of camera frame rates $[\omega_{camj}]$ are mutually prime;

iteratively performing for each camera frame rate serving as the base frequency from the set of camera frame rates $[\omega_{camj}]$:

capturing by the camera, a video having a predetermined length, of the one or more vibrating objects, when illuminated concurrently by the multiple strobe sources;

processing, by one or more hardware processors, the captured video to obtain a set of observed frequencies of vibration $[m_k]$, wherein each element thereof corresponds to one of the one or more vibrating objects; and obtaining, by the one or more hardware processors, a set of potential frequencies $[w_k]$ of the one or more vibrating objects using the set of camera frame rates $[\omega_{camj}]$ and the set of observed frequencies of vibration $[m_k]$;

obtaining, by the one or more hardware processors, a set $[C_{11}]$ of common potential frequencies between the set of potential frequencies $[w_k]$ obtained for each camera frame rate from the set of camera frame rates $[\omega_{camj}]$, wherein the step of obtaining the set of potential frequencies $[w_k]$ of the one or more vibrating objects comprises:

generating a first matrix $w_{est1}(i,j)$ of evaluated frequencies of the one or more vibrating objects based on each camera frame rate selected from the set of camera frame rates $[\omega_{camj}]$ and each observed frequency from the set of observed frequencies of vibration $[m_k]$;

generating a second matrix $w_{est2}(i,j)$ of evaluated frequencies of the one or more vibrating objects based on each camera frame rate selected from the set of camera frame rates $[\omega_{camj}]$ and each observed frequency from the set of observed frequencies of vibration $[m_k]$, wherein $w_{est1}(i,j)=\omega_{cam}\times i+m(:,j)$; and $w_{est2}(i,j)=\omega_{cam}\times i-m(:,j)$; and concatenating the first matrix $w_{est1}(i,j)$ and the second matrix $w_{est2}(i,j)$ to obtain the set of potential frequencies $[w_k]$; and detecting, by the one or more hardware processors, frequency of the one or more vibrating objects by:

associating elements of the set $[C_{11}]$ of common potential frequencies as a vibration frequency corresponding to the one or more vibrating objects if the cardinality of the set $[C_{11}]$ is equal to the number of the one or more vibrating objects (212a); or iteratively performing:

identifying a camera frame rate from the set of camera frame rates $[\omega_{camj}]$ having a maximum variation between the cardinality of the set $[C_{11}]$ and the number of the one or more vibrating objects by analyzing kurtosis of the set $[C_{11}]$; and obtaining the set $[C_{11}]$ of common potential frequencies between the set of potential frequencies $[w_k]$ obtained for each camera frame rate from the set of camera frame rates $[\omega_{camj}]$;

identifying common potential frequencies $[C_{21}]$ between the set of potential frequencies $[w_k]$ and the set $[C_{11}]$ of common potential frequencies results in the cardinality of the set $[C_{21}]$ that is equal to the number of the one or more vibrating objects.

2. The processor implemented method of claim 1, wherein the number of strobe sources is predefined such that the one or more vibrating objects are under coverage of the multiple strobe sources.

3. The processor implemented method of claim 1, wherein $\omega_{si}=(i+1)\times\omega_{camj}$; and wherein i is a positive integer.

4. The processor implemented method of claim 1, wherein the predetermined length of the video is 1 second.

5. A system for detecting frequency of one or more vibrating objects using multiple strobe sources comprising:

a predefined number of strobe sources (104a-104f) configured to illuminate one or more vibrating objects concurrently, the strobe sources having a corresponding operating frequency forming a set of strobing frequencies $[\omega_{si}]$, wherein the operating frequency of each of the strobe sources is a unique multiple of a base frequency being a camera frame rate selected from a set of camera frame rates $[\omega_{camj}]$ associated with a camera, wherein elements of the set of camera frame rates $[\omega_{camj}]$ are mutually prime;

the camera configured to capture a video having a predetermined length, of the one or more vibrating objects, when illuminated concurrently by the multiple strobe sources;

a controller in communication with each of the multiple strobe sources and the camera, wherein the controller comprises:

one or more data storage devices operatively coupled to one or more hardware processors and configured to store instructions configured for execution by the one or more hardware processors to:

iteratively perform for each camera frame rate serving as the base frequency from the set of camera frame rates $[\omega_{camj}]$:

processing the captured video to obtain a set of observed frequencies of vibration $[m_k]$, wherein each element thereof corresponds to one of the one or more vibrating objects; and obtaining a set of potential frequencies $[w_k]$ of the one or more vibrating objects using the set of camera frame rates [$\omega_{camj}$] and the set of observed frequencies of vibration [$m_k$];

obtain, a set [$C_{11}$] of common potential frequencies between the set of potential frequencies [$w_k$] obtained for each camera frame rate from the set of camera frame rates [$\omega_{camj}$], wherein the step of obtaining the set of potential frequencies [$w_k$] of the one or more vibrating objects comprises:

generating a first matrix $w_{est1}(i,j)$ of evaluated frequencies of the one or more vibrating objects based on each camera frame rate selected from the set of camera frame rates [$\omega_{camj}$] and each observed frequency from the set of observed frequencies of vibration [$m_k$];

generating a second matrix $w_{est2}(i,j)$ of evaluated frequencies of the one or more vibrating objects based on each camera frame rate selected from the set of camera frame rates [$\omega_{camj}$] and each observed frequency from the set of observed frequencies of vibration [$m_k$], wherein $w_{est1}(i,j) = \omega_{cam} \times i + m(:,j)$; and $w_{est2}(i,j) = \omega_{cam} \times i - m(:,j)$; and concatenating the first matrix $w_{est1}(i,j)$ and the second matrix $w_{est2}(i,j)$ to obtain the set of potential frequencies [$w_k$];

detect frequency of the one or more vibrating objects by:

associating elements of the set [$C_{11}$] of common potential frequencies as a vibration frequency corresponding to the one or more vibrating objects if the cardinality of the set [$C_{11}$] is equal to the number of the one or more vibrating objects; or iteratively perform:

identifying a camera frame rate from the set of camera frame rates [$\omega_{camj}$] having a maximum variation between the cardinality of the set [$C_{11}$] and the number of the one or more vibrating objects by analyzing kurtosis of the set [$C_{11}$]; and obtaining the set [$C_{11}$] of common potential frequencies between the set of potential frequencies [$w_k$] obtained for each camera frame rate from the set of camera frame rates [$\omega_{camj}$];

identifying common potential frequencies [$C_{21}$] between the set of potential frequencies [$w_k$] and the set [$C_{11}$] of common potential frequencies results in the cardinality of the set [$C_{21}$] that is equal to the number of the one or more vibrating objects.

6. The system of claim 5, wherein the number of strobe sources is predefined such that the one or more vibrating objects are under coverage of the multiple strobe sources.

7. The system of claim 5, wherein $\omega_{si} = (i+1) \times \omega_{camj}$; and wherein i is a positive integer.

8. The system of claim 5, wherein the predetermined length of the video is 1 second.

* * * * *